(No Model.)
T. D. OBERSKY & S. FISCHER.
COAL KINDLER.
No. 365,271. Patented June 21, 1887.
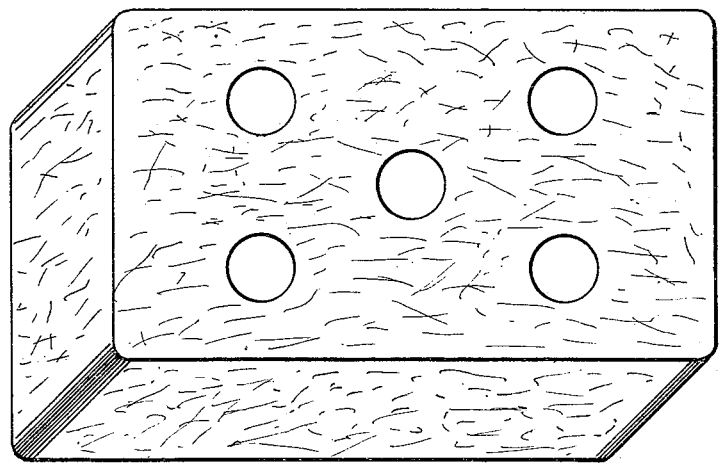
Witnesses
Alfred Jonghmans
William Partington
Inventors:
T. D. Obersky &
S. Fischer
per Roeder & Biesen attys.

UNITED STATES PATENT OFFICE.

THEODOR D. OBERSKY AND SAMUEL FISCHER, OF NEW YORK, N. Y.

COAL-KINDLER.

SPECIFICATION forming part of Letters Patent No. 365,271, dated June 21, 1887.

Application filed March 4, 1887. Serial No. 229,680. (No specimens.)

*To all whom it may concern:*

Be it known that we, THEODOR D. OBERSKY, a citizen of Germany, and SAMUEL FISCHER, a citizen of Austria-Hungary, both residing at New York, in the county and State of New York, have invented a new and Improved Coal-Kindler, of which the following is a specification.

This invention relates to a fire-kindler made in the form of a dry odorless brick, and by means of which coal may be kindled without the use of wood or paper.

The invention consists in the composition of ingredients hereinafter more fully pointed out.

The accompanying drawing represents a perspective view of our kindler.

In preparing our improved kindler we use the following ingredients: sawdust, forty-eight parts; wood shavings, two parts; cotton, two parts; rosin, thirty-three parts; tar, two parts; pitch, ten parts; sulphur, one part; animal fat, two parts; total, one hundred parts.

The rosin, tar, pitch, cotton, wood shavings, and sulphur are mixed together and are boiled for five or ten minutes, until the tar, rosin, pitch, and sulphur melt and form a homogeneous mass. The sawdust is then stirred in and the entire mass is put into a mold, which is covered with fat, and which is provided with a number of cores, so that the brick when completed will be provided with a number of transverse perforations, as shown in the drawing, through which the flame may reach the interior of the brick. The animal fat is to prevent the brick from adhering to the mold, and it will at the same time be absorbed by the surfaces of the brick, so as to increase the combustibility of such surfaces, while the interior of the brick, being without the fat, will burn more slowly. The brick is compressed within the mold for about five minutes, when it will be hard and ready for use.

The sawdust in the above composition serves to nourish the flame. The wood shavings have a similar purpose; but while the sawdust is consumed quickly and will catch fire more freely, the shavings will maintain the fire for a longer time. The rosin, as well as the sulphur, is used to quickly ignite the mass. The tar, besides igniting quickly, renders the mass pliable, while the pitch serves to give it body. The object of the fat at the surface has already been stated.

The cotton aids to hasten the combustion, as the tar, rosin, pitch, and fat soak into it. Moreover, the cotton renders the mass porous and prevents it from becoming too compact.

We claim as our invention—

A kindler composed of sawdust, cotton, wood shavings, rosin, tar, pitch, sulphur, and of animal fat, which is contained only within its surfaces, while the interior of the kindler is without such fat, substantially as specified.

THEODOR D. OBERSKY.
SAMUEL FISCHER.

Witnesses:
F. V. BRIESEN,
WILLIAM PARTINGTON.